United States Patent [19]
McKoy

[11] Patent Number: 6,026,423
[45] Date of Patent: *Feb. 15, 2000

[54] FRACTIONAL PRECISION INTEGER SQUARE ROOT PROCESSOR AND METHOD FOR USE WITH ELECTRONIC CIRCUIT BREAKER SYSTEMS

[75] Inventor: Michael E. McKoy, Dacula, Ga.

[73] Assignee: Siemens Energy & Automation, Inc., Alpharetta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/625,489

[22] Filed: Mar. 29, 1996

[51] Int. Cl.⁷ ..................................................... G06F 7/38
[52] U.S. Cl. ............................................................ 708/605
[58] Field of Search ..................................... 364/718, 719, 364/723, 752, 735; 708/446, 605

[56] References Cited

U.S. PATENT DOCUMENTS

| | | | |
|---|---|---|---|
| 4,336,599 | 6/1982 | Wong | 364/752 |
| 4,503,549 | 3/1985 | Slabinski | 364/752 X |
| 4,878,190 | 10/1989 | Darley et al. | 364/752 |
| 4,949,296 | 8/1990 | Malinowski | 364/752 |
| 5,151,874 | 9/1992 | Jeong et al. | 364/752 |
| 5,181,186 | 1/1993 | Al-Ofi | 364/287 |
| 5,202,960 | 4/1993 | Seiler | 364/518 |
| 5,268,857 | 12/1993 | Chen | 364/752 |
| 5,386,375 | 1/1995 | Smith | 364/752 |
| 5,408,267 | 4/1995 | Main | 348/254 |
| 5,459,681 | 10/1995 | Harrison et al. | 364/715.01 |

FOREIGN PATENT DOCUMENTS 58-090727   5/1983   Japan .
63-254487  10/1988   Japan .

OTHER PUBLICATIONS

"Apple Assembly Line", vol. 5, Issue 2, Nov. 1994.
"Arithmetic Operations In Digital Computers", R. K. Richards Van Nostrand, 1955, pp. 290–294.

Primary Examiner—Chuong Dinh Ngo
Attorney, Agent, or Firm—J. Marc Asperas, Siemens IPD

[57] ABSTRACT

A processor system apparatus and method for determining a square root of a particular value of a square of a parameter for use with an electronic circuit breaker system. The system comprises a signal processor or logic circuit for receiving and using at least one input signal to process and output at least one output signal, wherein the logic circuit is configured to determine a whole root of the square root of a particular value of the square of a parameter, wherein the logic circuit is configured to determine a slope of the square of a parameter bounded by at least a first point and a second point, where the first point corresponds to a first value of the square of a parameter and the second point corresponds to a second value of the square of a parameter, wherein the logic circuit is configured to determine a difference between the particular value of the square of a parameter and a value of a square of the whole root, wherein the logic circuit is configured to determine a fractional part of the square root of a particular value of the square of a parameter using the slope and the difference, wherein the logic circuit is configured to determine the square root by combining the whole root of the square root and the fractional part of the square root, and wherein the logic circuit outputs at least one output signal using the square root.

22 Claims, 4 Drawing Sheets

FRACTIONAL PRECISION INTEGER SQUARE ROOT PROCESSOR AND METHOD FOR USE WITH ELECTRONIC CIRCUIT BREAKER SYSTEMS

BACKGROUND OF THE INVENTION

1. Field of the Invention

This invention relates to embedded system applications for use with electronic circuit breaker systems in which the embedded system applications require at least square root computations. This invention further relates to microcontroller or microprocessor based systems that determine at least square roots using a fractional precision integer square root method to relatively accurately and quickly determine at least the square roots of integer values of various input parameters associated with electronic circuit breaker systems.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

2. Description of Related Art

To determine at least the square root of a number, known embedded system applications may use certain commercially available language compilers, such as C-language compilers that use a floating point square root method having double precision accuracy. For certain embedded systems applications, however, double precision accuracy may not be required. Accordingly, such applications may also use a relatively fast integer method. The accuracy of this method, however, may not be adequate in certain applications.

One example of an embedded system application that requires greater speed than the floating point method and better accuracy than the fast integer method are electronic circuit breaker systems that are capable of measuring various input parameters representing electrical energy usage in approximately real-time, such as are used in the power industry. However, determining the RMS values for current or voltage input parameters or determining at least the square-roots associated with certain harmonics calculations may require a significant portion of the computing time of the processor(s) of the electronic circuit breaker system. Commercially available C-language compilers using floating point methods may take on the order of approximately 10 milliseconds to run on a 16-bit microcontroller or microprocessor running at 16 MHZ.

Accordingly, in electronic circuit breaker system applications, the processor that determines the RMS currents and voltages in approximately real-time to measure energy usage may use on the order of about fifty (50) percent of its computing time to determine square roots using such floating point methods. In particular, electronic circuit breaker systems that measure energy usage may require on the order of about 50 square root calculations every second. If the processor takes 10 milliseconds to determine each square root, then the processor will use on the order of one-half (½) second of a one second interval simply to determine the square roots of various measured input parameters. Where energy measurement is done in approximately real-time, this may leave insufficient processing time for other purposes, such as updating displays, reading keypads and handling communications to a remote processor.

SUMMARY OF THE INVENTION

It is an object of the present invention to overcome the speed limitations of the double precision floating point method of certain known commercial language compilers and the accuracy limitations of the fast integer method for determining at least square roots in embedded system applications, including embedded system applications for electronic circuit breaker systems that measure energy usage. More specifically, it is an object of the present invention to provide a relatively accurate and relatively fast method of determining at least the square roots of the integer values of measured input parameters for use in such embedded system applications.

According to one aspect of the present invention, a processor system apparatus is provided for determining a square root of a particular value of a square of a parameter for use with an electronic circuit breaker system, comprising: a logic circuit receiving and using at least one input signal to process and output at least one output signal, wherein the logic circuit is configured to determine a whole root of the square root of a particular value of the square of a parameter, wherein the logic circuit is configured to determine a slope of the square of a parameter bounded by at least a first point and a second point, where the first point corresponds to a first value of the square of a parameter and the second point corresponds to a second value of the square of a parameter, wherein the logic circuit is configured to determine a difference between the particular value of the square of a parameter and a value of a square of the whole root, wherein the logic circuit is configured to determine a fractional part of the square root of a particular value of the square of a parameter using the slope and the difference, wherein the logic circuit is configured to determine the square root by combining the whole root of the square root and the fractional part of the square root, and wherein the logic circuit outputs at least one output signal using the square root.

According to another aspect of the present invention, which achieves one or more of these objectives, a method is provided for determining a square root of a particular value of a square of a parameter for use with an electronic circuit breaker system, and comprises the steps of: determining a whole root of the square root of a particular value of the square of a parameter; determining a slope of the square of a parameter bounded by at least a first point and a second point, where the first point corresponds to a first value of the square of a parameter and the second point corresponds to a second value of the square of a parameter; determining a difference between the particular value of the square of a parameter and a value of a square of the whole root; determining a fractional part of the square root of a particular value of the square of a parameter using the slope and the difference; and combining the whole root of the square root and the fractional part of the square root.

According to another aspect of the present invention, a processor system apparatus is provided for determining a polynomial root of a particular value of a polynomial of a parameter for use with an electronic circuit breaker system, comprising: a logic circuit receiving and using at least one input signal to process and output at least one output signal, wherein the logic circuit is configured to determine a whole root of the polynomial root of a particular value of the polynomial of a parameter, wherein the logic circuit is configured to determine a slope of the polynomial of a parameter bounded by at least a first point and a second point, where the first point corresponds to a first value of the polynomial of a parameter and the second point corresponds to a second value of the polynomial of a parameter, wherein the logic circuit is configured to determine a difference between the particular value of the polynomial of a parameter and a value of a polynomial of the whole root, wherein the logic circuit is configured to determine a fractional part of the polynomial root of a particular value of the polynomial of a parameter using the slope and the difference, wherein the logic circuit is configured to determine the polynomial root by combining the whole root of the polynomial root and the fractional part of the polynomial root, and wherein the logic circuit outputs at least one output signal using the polynomial root.

According to another aspect of the present invention, which achieves one or more of these objectives, a method is provided for determining a polynomial root of a particular value of a polynomial of a parameter for use with an electronic circuit breaker system, comprising the steps of: determining a whole root of the polynomial root of a particular value of the polynomial of a parameter; determining a slope of the polynomial of a parameter bounded by at least a first point and a second point, where the first point corresponds to a first value of the polynomial of a parameter and the second point corresponds to a second value of the polynomial of a parameter; determining a difference between the particular value of the polynomial of a parameter and a value of a polynomial of the whole root; determining a fractional part of the polynomial root of a particular value of the polynomial of a parameter using the slope and the difference; and combining the whole root of the polynomial root and the fractional part of the polynomial root.

According to another aspect of the present invention, a processor system is provided for determining a square root of a particular value of a square of a parameter for use with an electronic circuit breaker system, comprising: a logic circuit means for receiving and using at least one input signal to process and output at least one output signal, wherein the logic circuit means determines a whole root of the square root of a particular value of the square of a parameter, wherein the logic circuit means determines a slope of the square of a parameter bounded by at least a first point and a second point, where the first point corresponds to a first value of the square of a parameter and the second point corresponds to a second value of the square of a parameter, wherein the logic circuit means determines a difference between the particular value of the square of a parameter and a value of a square of the whole root, wherein the logic circuit means determines a fractional part of the square root of a particular value of the square of a parameter using the slope and the difference, wherein the logic circuit means determines the square root by combining the whole root of the square root and the fractional part of the square root, and wherein the logic circuit means outputs at least one output signal using the square root.

According to another aspect of the invention, a processor system is provided for determining a polynomial root of a particular value of a polynomial of a parameter for use with an electronic circuit breaker system, comprising: a logic circuit means for receiving and using at least one input signal to process and output at least one output signal, wherein the logic circuit means determines a whole root of the polynomial root of a particular value of the polynomial of a parameter, wherein the logic circuit means determines a slope of the polynomial of a parameter bounded by at least a first point and a second point, where the first point corresponds to a first value of the polynomial of a parameter and the second point corresponds to a second value of the polynomial of a parameter, wherein the logic circuit means determines a difference between the particular value of the polynomial of a parameter and a value of a polynomial of the whole root, wherein the logic circuit means determines a fractional part of the polynomial root of a particular value of the polynomial of a parameter using the slope and the difference, wherein the logic circuit means determines the polynomial root by combining the whole root of the polynomial root and the fractional part of the polynomial root, and wherein the logic circuit means outputs at least one output signal using the polynomial root.

These and other objects, advantages and features of the present invention will be readily understood and appreciated with reference to the detailed description of preferred embodiments discussed below together with the accompanying drawings.

DETAILED DESCRIPTION OF PREFERRED EMBODIMENT

Figure 3:
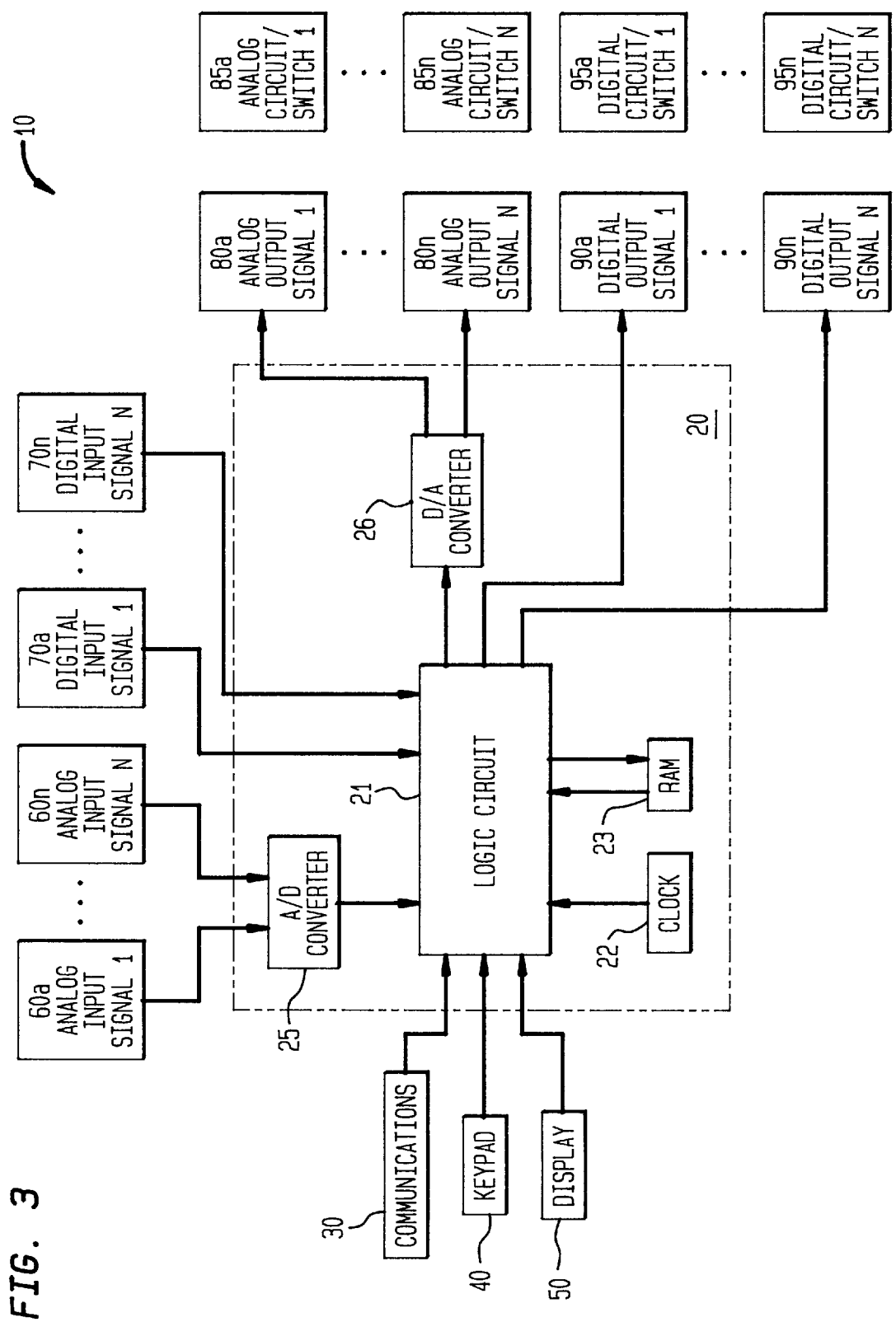
FIG. 3 is a schematic block diagram of the system having a signal processor or logic circuit for determining in part at least the square roots of integer values of various measured parameters.

FIG. 3 shows the schematic block diagram of the present system 10 comprising the logic and control circuit 20. The logic and control circuit 20 comprises a logic circuit 21, a clock 22, a random-access-memory (RAM) 23 or other appropriate memory, and may include an analog-to-digital (A/D) converter 25 or a digital-to-analog (D/A) converter 26. The system 10 may further comprise communications 30, a keypad 40 and a display 50 for use with the logic circuit 21. The communications 30 enables the logic circuit 21 to communicate energy information from the logic circuit 21 to a remote processor (not shown). As this capability is known to those skilled in the art, it will not be further described herein. The logic circuit 21 may comprise one or more microprocessors, each of which comprises a central processing unit (CPU) and a read-only-memory (ROM). The logic circuit 21 may also be implemented using a dedicated configuration of digital logic elements, gate array technology or any other appropriate hardwired logic circuit technology.

The logic circuit 21 interfaces with the clock 22, manages data flow to and from the RAM 23 and converters 25 and 26 and performs all computations for determining output signals that relate to the determined square root values of the values of the measured input parameters or input signals. The analog-to-digital converter 25 may be used to convert one or more analog input signals (1, 2, . . ., N; blocks 60a to 60n) to digital signals that are input to and processed by the logic circuit 21. Preferably, a twelve-bit analog-to-digital (A/D) converter 25 is used to provide better data resolution for controlling the various features, such as the alarm circuit, of the electronic circuit breaker system. It is believed, however, that an eight-bit analog-to-digital (A/D) converter may also provide adequate data resolution depending on the specific application.

With respect to the present system, the analog or digital input signals may include any analog input signal used therein, including, for example, analog samples of the current, voltage and their sinusoidal components or harmonic characteristics. Of course, digital versions of these same input signals may also be input to the logic circuit 21 as digital input signals 70 (1, 2, . . ., N; blocks 70a to 70n).

The analog output signals 80 (1, 2, . . ., N; blocks 80a to 80n) may include any analog output signal used in electronic circuit breaker systems that measure energy usage. The analog circuits/switches 85 (1, 2, . . ., N; blocks 85a to 85n) may include the circuits or switches that are used to control, for example, an alarm in the electronic circuit breaker system. Of course, digital output signals 90 (1, 2, . . ., N; blocks 90a to 90n) may also be output to digital circuits/switches 95 (1, 2, . . ., N; blocks 95a to 95n) to the extent that the control signals are digital and not analog.

The system 10 is an electronic circuit breaker system that is used to measure energy usage, such as is readily known and available to those skilled in the art. In this regard, the electronic circuit breaker systems may comprise the electronic circuit breaker trip units of the type produced by Siemens Energy & Automation, Inc. for their "SB" case system breaker product line. Of course, it is understood that the present system may be used with other similarly appropriate electronic circuit breaker trip units produced by other manufacturers without departing from the spirit and scope of the present invention.

More particularly, the electronic circuit breaker trip unit (not shown) may include, for example, the "Dual Process Electric Power Trip Unit" of U.S. Pat. No. 5,311,392, which is also assigned to Siemens Energy & Automation, Inc. The electronic circuit breaker trip unit may comprise a mechanical breaker portion that is used to interrupt or provide electrical power to an electrical load and an electronic portion that may be like the one shown in U.S. Pat. No. 5,311,392. The protective features of the electronic circuit breaker system allow it to trip when certain events occur or to activate an alarm signal so as to sound an alarm or open the breaker, depending on the system configuration that the user selects.

The feature of measuring energy usage that may be provided with such electronic circuit breaker trip units involves collecting current and voltage samples, determining and storing functions of these samples which may indicate significant events, and logging these events as they occur. Root-mean-square values are determined from sampled values of the monitored current and voltage input parameters taken over some interval, such as one second. Some sampling techniques and the methods that may be used to determine the RMS current and voltage values are described, for example, in U.S. Pat. No. 5,311,392. Additionally, other parameters such as phase currents and voltages, average phase currents and voltages, average line-line voltages, ground and neutral currents, frequency, real power, reactive power, apparent power, power factor, kilowatt hours (KWH) and KWH reverse, kilovar hours, kilovar demand, harmonic distortion and any other appropriate parameters may also be determined from the current and voltage samples by methods well known to persons skilled in the art.

Figure 1:
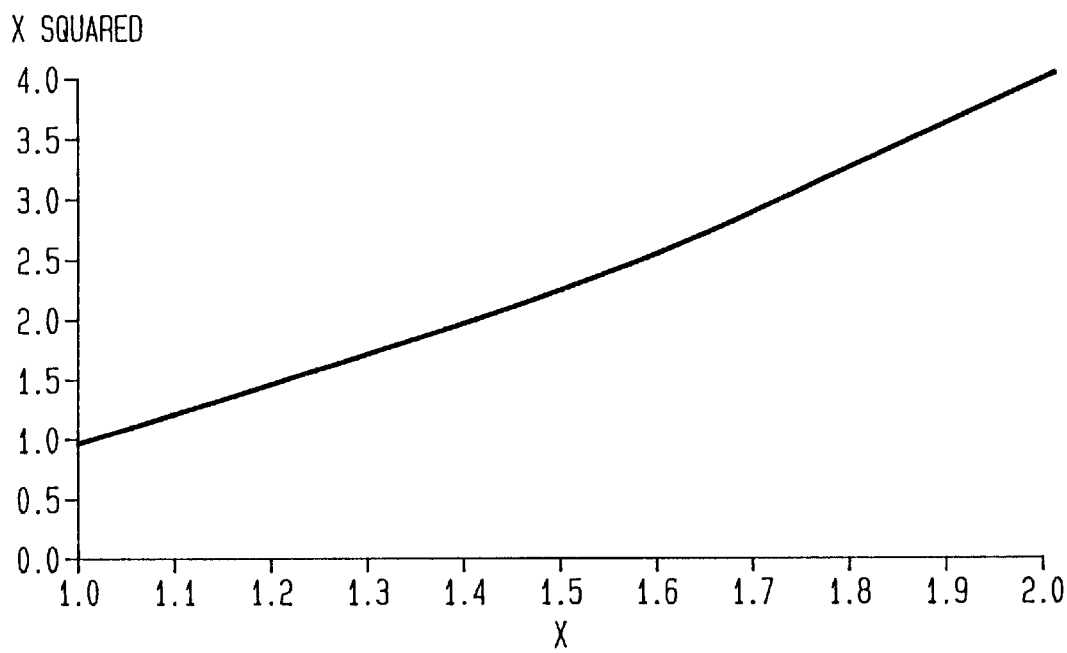
FIG. 1 is a chart showing the relative nonlinearity of the square of X at lower values of X.
Figure 2:
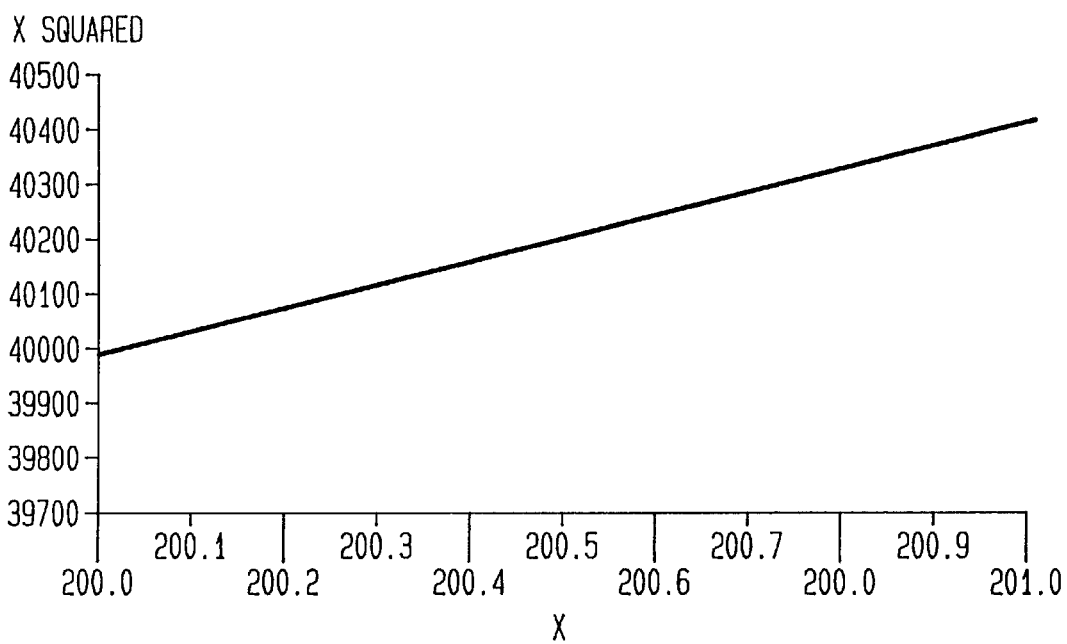
FIG. 2 is a chart showing the relative linearity of the square of X at higher values of X.

The method for determining a polynomial root, where the polynomial is a square, of some of the various input parameters is done in the following way. As shown in FIGS. 1 and 2, for increasing X, the line function $X^2$ becomes more linear for a given unit change in X. For example, the function $X^2$ between $X_1=2$ and $X_2=3$ is less linear than the line function $X^2$ between $X_1=200$ and $X_2=201$.

Accordingly, since $X^2$ is more linear at higher numbers on the X axis and since integer values on the X axis represent the whole root of the function $X^2$, the decimal fractional part of the square root may be determined by determining the slope of the line between the whole roots bounding a particular value of $X^2$ for which the square root must be determined.

The logic circuit 21 first obtains the whole root below the $X^2$ value from a look-up table which contains the square of an integer X ranging from 1 to $2^n$, where n =8 for eight (8) bit integer values for a 16-bit microprocessor, since sixteen (16) bits are needed to represent the squared value of the whole root integer values so that $X^2$ ranges from 0 to $2^{2n}$. In particular, for n=8, X ranges from 0 to 255 and $X^2$ correspondingly ranges from 0 to 65,025. If the value of $X^2$ is a perfect square, then the result from the look-up table is the square root of the value of $X^2$. Otherwise, the result is the next lower whole root $WR_B$ corresponding to a perfect square that is below that particular value of $X^2$. For example, where $x^2=15$, the whole root $WR_B$ of the square root from the look-up table is 3.

To determine the decimal or fractional part DR of the square root of $X^2$, the slope of the line between the lower whole root $WR_B$ and the next higher whole root $WR_A$ must be determined. This may be done by multiplying the whole root $WR_B$ which has a perfect square $WR_B^2$ that is below the particular value of $X^2$ by two (2) and adding one (1). The difference between $X^2$ and $WR_B^2$ is then divided by the slope (the divisor) to determine the remaining decimal fractional part DR of the square root of the value $X^2$. Alternatively, of course, $WR_A$ may be used to determine the slope by multiplying the whole root $WR_A$ (which has a perfect square $WR_A^2$ that is above the particular value of $X^2$) by two (2) and subtracting one (1).

More specifically, the square root of $X^2$, where, for example, $x^2=40,200$ (see FIG. 2), is determined as follows:

The logic circuit 21 first uses the look-up table to find the closest whole root $WR_B$ having a perfect square $WR_B^2$ that is below the value of $X^2$, namely 40,200. Next, the logic circuit 21 determines the difference between $X^2$ and $WR_B^2$. The logic circuit 21 then divides the difference of 200 between $X^2$ and $WR_B^2$ by the slope of the line. The slope of the square of the parameter X is bounded by at least a first point $X^2$ and a second point $WR_B^2$, where the first point $X^2$ corresponds to a first value of the particular value of a square of a parameter X and the second point $WR_B^2$ corresponds to a second value of the square of a parameter X, $X=WR_B^2$. Importantly, for values of X greater than 2, the slope of the line is equal to $2(X-1)+1$, where $X-1$ is the whole root $WR_B$ having a perfect square $WR_B^2$ that is below the value of $x^2$ so that the slope of the line is equal to $2WR_B+1$. Since processing speed is important, the logic circuit 21 scales $WR_B$, by a scaling factor SF2 that is $100^2$ (SQRT (SF2) =100) so as to maintain two (2) places of accuracy in the solution while using only integers. Next, the logic circuit 21 determines the decimal or fractional part DR of the square root, where the integer portion of DR $=((WR_B \times SF2)/(2WR_B+1))/(SQRT (SF2))$, which is 49. The logic circuit 21 then returns the square root of the particular value of $X^2$, which is $WR_B$ appended to DR, namely 20049. In comparison, the square root obtained using a floating point method would return 200.4993766.

Also, if $X^2$ is less than 300, then the logic circuit 21 scales $X^2$ by the scaling factor SF2 (100²) to shift the values toward the more linear part of the $X^2$ line function. The logic circuit 21 then determines the square root of the value of $X^2$ as described above, after which it divides it by the square root of SF2, where SQRT(SF2)=100.

For values of $X^2$ equal to or greater than 85, the percentage difference with respect to the floating point method is on the order of about 0.10 percent. For values of X below 85, the percentage difference with respect to the floating point method ranges from on the order of about 0.10 percent to 0.30 percent. Significantly, it has been determined that the present method is on the order of about twenty-five (25) times as fast as double precision floating point methods used by a commercial C-language compiler available from Introl Inc. of Milwaukee, Wis.

Figure 4:
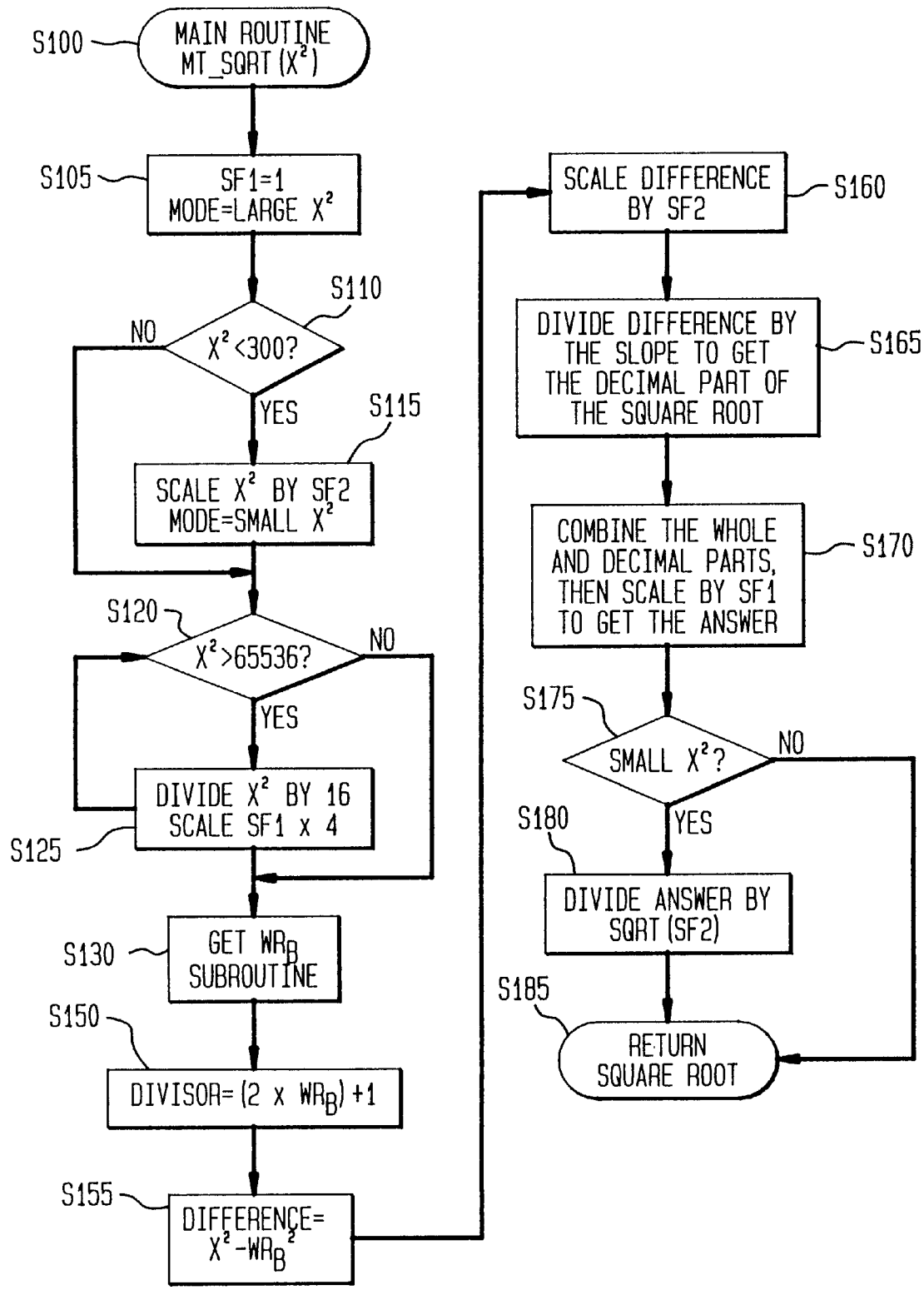
FIGS. 4 and 5 are flow charts illustrating the method of the present invention for determining at least the square roots of integer values of various measured input parameters.

Referring to FIG. 4, this figure shows the specific logic flow chart and method for determining the square root of any appropriate value of some analog input parameter, such as current, voltage or some other appropriate input parameter, which the logic circuit 21 may then process so as to output signals, such as to control an alarm on the circuit breaker system or provide to a remote processor (not shown) through communications 30.

First, in step S100, the logic circuit 21 has obtained the appropriate input parameter value or values and enters the main square root routine (MT_sqrt routine). Next, in step S105, the logic circuit 21 sets a first scaling factor SF1 to one (1) and also sets the operational mode to the "Large $X^2$" mode.

In step S110, the logic circuit 21 determines whether the value of $X^2$ is less than 300, and if not, it continues to step S120. Otherwise, if the value is less than 300, then the logic circuit 21 scales the value of $X^2$ by a second scaling factor SF2 of 100² (i.e., 10,000), sets the mode to the "Small $X^2$" mode and then continues to step S120.

In step S120, the logic circuit 21 determines whether the value of $X^2$ exceeds the square of $2^n$, where n may be 8 for 16-bit microprocessor. The number n may, of course, vary depending on how the software is written and the particular microprocessor or microcontroller that is used.

Figure 5:
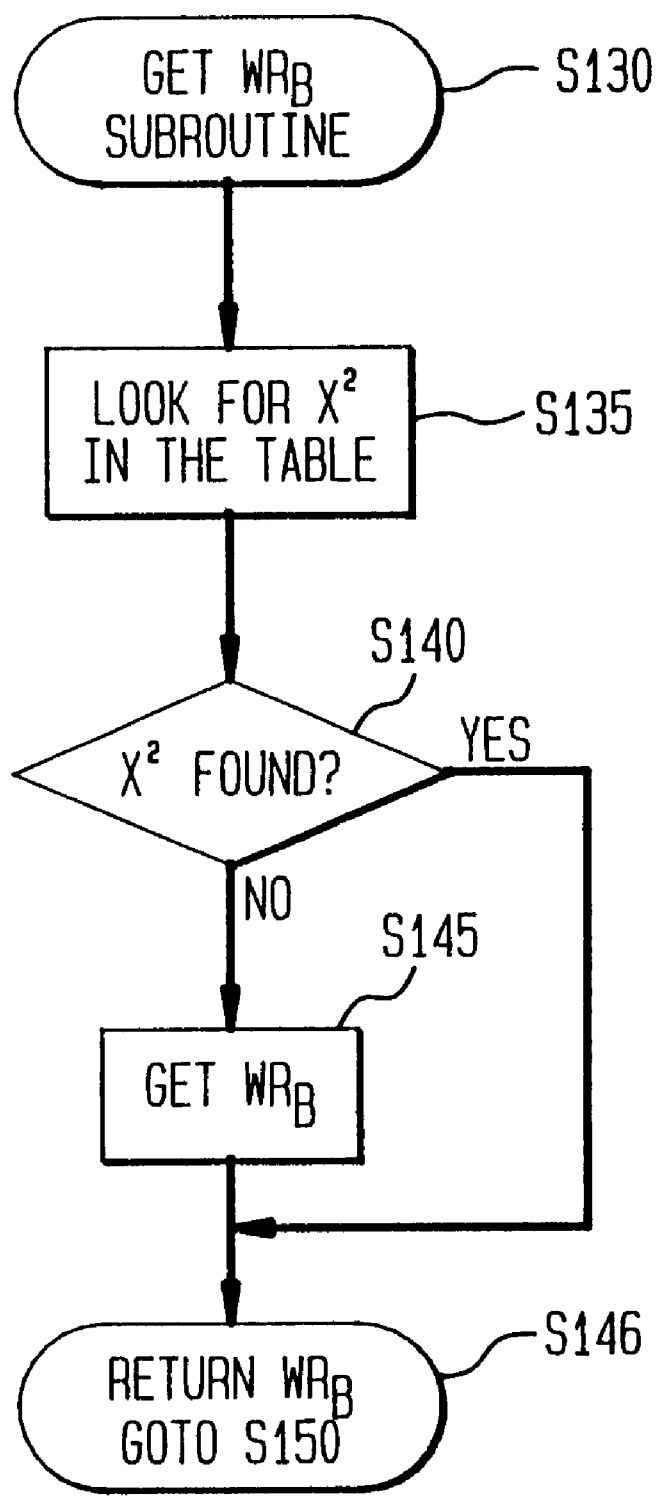

If the value of $X^2$ does not exceed 65,536 (i.e., $(2^8)^2$) in step S120, then in step S130 the logic circuit 21 calls the (MT_get_root) subroutine to get or determine the whole root $WR_B$ of the value of $X^2$ from the look-up table. FIG. 5 shows the logic flow chart for the get $WR_B$ (Mt_get_root) subroutine beginning at step S130, and is described later.

If the logic circuit 21 determines in step S120 that the value exceeds 65,536, then in step S125 the logic circuit 21 divides the value by 4² (i.e., 16) and further scales SF1 by 4. The logic circuit 21 repeats step S120 until it determines that the value of $X^2$ does not exceed 65,536, after which the logic circuit 21 continues to step S130 and determines the whole root $WR_B$ of the value of $X^2$ from the look-up table.

After determining $WR_B$, in step S150, the logic circuit 21 determines the slope (divisor) of the line function $x^2$ by scaling the whole root $WR_B$ of the value $WR_B^2$ by two (2) and adding one (1) (i.e., slope (or divisor)=(²$WR_B$+1)).

In step S155, the logic circuit 21 determines the difference between $WR_B^2$ and $X^2$. Then, in step S160, the logic circuit 21 scales this difference by the scaling factor SF2, where SF2=100² (i.e., 10,000). In step S165, the logic circuit 21 divides the difference by the slope (or divisor), which was determined in step S150, to determine the decimal or fractional part DR of the square root of the particular value of $X^2$. In step S170, the logic circuit 21 appends the fractional portion DR to the whole root $WR_B$ so as to provide the square root of the value of $X^2$ to two places. Additionally, if the logic circuit 21 is in the "Small $X^2$" mode, then the logic circuit 21 must divide the answer or square root by 100 in step S180, since the value of $X^2$ (i.e., the square of the square root) was scaled by SF2 (100² or 10,000) in step S115. Finally, the logic circuit 21 provides or returns the answer, namely the square root of the value of $X^2$, in step S185 for further appropriate processing, such as determining the RMS current or voltage.

Using the GET $WR_B$ (MT_get_root) subroutine to determine $WR_B$, which begins at step S130, the logic circuit 21 determines the whole root portion $WR_B$, of the square root of the particular value of $X^2$. In particular, in step S135, the logic circuit 21 looks up or searches the "squares table" for the value of $X^2$. If the particular value of $X^2$ is found in step S140, then the logic circuit 21 returns $WR_B$ (which is an exact square root) in step S150 to the main routine, namely the main (MT_sqrt) routine. If the value is not found in step S140, then the logic circuit 21 determines the closest perfect square $WR_B^2$ below the value of $X^2$ and the corresponding $WR_B$, which is the whole portion $WR_B$ of the square root of the closest perfect square below $X^2$, and returns $WR_B$ in step S150 to the main program routine.

Although the logic flow chart discussed in the specification and shown in FIGS. 4 and 5 is programmed into a well-known signal processor, namely a microprocessor, it may also be implemented using digital hardwired logic by persons having ordinary skill in the art. Since such digital circuit construction or programming per se is not part of the invention, no further description thereof is deemed necessary.

While the present invention has been described in connection with what are the most practical and preferred embodiments as currently contemplated, it should be understood that the present invention is not limited to the disclosed embodiments. Accordingly, the present invention is intended to cover various modifications and equivalent arrangements, methods and structures that are within the spirit and scope of the claims.

What is claimed is:

1. A method of determining a square root of a particular value of a square of a parameter which relates to at least one of an input current signal and an input voltage signal obtained by a circuit breaker system, the method comprising the steps of:

measuring at least one of the input current signal and the input voltage signal obtained by the circuit breaker system;

deriving said square of said parameter relating to at least one of said input current signal and said input voltage signal;

determining a whole root of said square root of a particular value of said square of said parameter;

determining a slope of said square of said parameter bounded by at least a first point and a second point, where said first point corresponds to a first value of said square of said parameter and said second point corresponds to a second value of said square of said parameter;

determining a difference between said particular value of said square of said parameter and a value of a square of said whole root;

determining a fractional part of said square root of said particular value of said square of said parameter using said slope and said difference; and combining said whole root of said square root and said fractional part of said square root.

2. The method of claim 1, in which said whole root is determined by using a look-up table to find a whole root of a perfect square nearest said particular value of said square of said parameter.

3. The method of claim 1, in which said fractional part of said square root is determined by determining a ratio of said difference and said slope.

4. The method of claim 1, in which said slope is determined by using said whole root.

5. The method of claim 4, in which said slope is determined by scaling said whole root.

6. A processor system for determining a square root of a particular value of a square of a parameter which relates to at least one of an input current signal and an input voltage signal obtained by a circuit breaker system, said system comprising:
   a logic circuit receiving and using said at least one of an input current signal and an input voltage signal to process and output at least one output signal;
   a circuit for measuring at least one of the input current signal and the input voltage signal obtained by the circuit breaker system;
   a circuit for deriving said square of said parameter relating to at least one of said input current signal and said input voltage signal;
   wherein said logic circuit is configured to determine a whole root of said square root of a particular value of said square of said parameter;
   wherein said logic circuit is configured to determine a slope of said square of said parameter bounded by at least a first point and a second point, where said first point corresponds to a first value of said square of said parameter and said second point corresponds to a second value of said square of said parameter;
   wherein said logic circuit is configured to determine a difference between said particular value of said square of said parameter and a value of a square of said whole root;
   wherein said logic circuit is configured to determine a fractional part of said square root of said particular value of said square of said parameter using said slope and said difference;
   wherein said logic circuit is configured to determine said square root by combining said whole root of said square root and said fractional part of said square root; and
   wherein said logic circuit outputs at least one output signal using said square root.

7. The system of claim 6, in which said logic circuit determines said whole root by using a look-up table to find a whole root of a perfect square nearest said particular value of said square of said parameter.

8. The system of claim 6, in which said logic circuit determines said fractional part of said square root by determining a ratio of said difference and said slope.

9. The system of claim 6, in which said logic circuit determines said slope by using said whole root.

10. The system of claim 9, in which said logic circuit determines said slope by scaling said whole root.

11. A method of determining a polynomial root of a particular value of a polynomial of a parameter which relates to at least one of an input current signal and an input voltage signal obtained by a circuit breaker system, said method comprising the steps of:
   measuring at least one of the input current signal and the input voltage signal obtained by the circuit breaker system;
   deriving said polynomial of said parameter relating to at least one of said input current signal and said input voltage signal;
   determining a whole root of said polynomial root of a particular value of said polynomial of said parameter;
   determining a slope of said polynomial of a parameter bounded by at least a first point and a second point, where said first point corresponds to a first value of said polynomial of said parameter and said second point corresponds to a second value of said polynomial of said parameter;
   determining a difference between said particular value of said polynomial of said parameter and a value of a polynomial of said whole root;
   determining a fractional part of said polynomial root of said particular value of said polynomial of said parameter using said slope and said difference; and
   combining said whole root of said polynomial root and said fractional part of said polynomial root.

12. The method of claim 11 in which said whole root is determined by using a look-up table to find a whole root of a perfect polynomial nearest said particular value of said polynomial of said parameter.

13. The method of claim 11, in which said fractional part of said polynomial root is determined by determining a ratio of said difference and said slope.

14. The method of claim 11, in which said slope is determined by using said whole root.

15. The method of claim 14, in which said slope is determined by scaling said whole root.

16. A processor system for determining a polynomial root of a particular value of a polynomial of a parameter which relates to at least one of an input current signal and an input voltage signal obtained by the circuit breaker system, said system comprising:
   a logic circuit receiving and using said at least one of an input current signal and an input voltage signal to process and output at least one output signal;
   a circuit for measuring at least one of the input current signal and the input voltage signal obtained by the circuit breaker system;
   a circuit for deriving said polynomial of said parameter relating to at least one of said input current signal and said input voltage signal;
   wherein said logic circuit is configured to determine a whole root of said polynomial root of a particular value of said polynomial of a parameter;
   wherein said logic circuit is configured to determine a slope of said polynomial of said parameter bounded by at least a first point and a second point, where said first point corresponds to a first value of said polynomial of said parameter and said second point corresponds to a second value of said polynomial of said parameter;
   wherein said logic circuit is configured to determine a difference between said particular value of said polynomial of said parameter and a value of a polynomial of said whole root;
   wherein said logic circuit is configured to determine a fractional part of said polynomial root of said particular value of said polynomial of said parameter using said slope of said difference;
   wherein said logic circuit is configured to determine said polynomial root by combining said whole root of said polynomial root and said fractional part of said polynomial root; and wherein said logic circuit outputs at least one output signal using said polynomial root.

17. The system of claim 16, in which said logic circuit determines said whole root by using a look-up table to find a whole root of a perfect polynomial nearest said particular value of said polynomial of said parameter.

18. The system of claim 16, in which said logic circuit determines said fractional part of said polynomial root by determining a ratio of said difference and said slope.

19. The system of claim 16, in which said logic circuit determines said slope by using said whole root.

20. The system of claim 19, in which said logic circuit determines said slope by scaling said whole root.

21. A processor system for determining a square root of a particular value of a square of a parameter which relates to at least one of an input current signal and an input voltage signal obtained by a circuit breaker system, said system comprising:

logic circuit means for receiving and using said at least one of an input current signal and an input voltage signal to process and output at least one output signal;

means for measuring at least one of the input current signal and the input voltage signal obtained by the circuit breaker system;

means for deriving said square of said parameter relating to at least one of said input current signal and said input voltage signal;

wherein said logic circuit means determines a whole root of said square root of a particular value of said square of said parameter;

wherein said logic circuit means determines a slope of said square of said parameter bounded by at least a first point and a second point, where said first point corresponds to a first value of said square of said parameter and said second point corresponds to a second value of said square of said parameter;

wherein said logic circuit means determines a difference between said particular value of said square of said parameter and a value of a square of said whole root;

wherein said logic circuit means determines a fractional part of said square root of said particular value of said square of said parameter using said slope and said difference;

wherein said logic circuit means determines said square root by combining said whole root of said square root and said fractional part of said square root; and wherein said logic circuit means outputs at least one output signal using said square root.

22. A processor system for determining a polynomial root of a particular value of a polynomial of a parameter which relates to at least one of an input current and an input voltage obtained by a circuit breaker system, said system comprising:

means for measuring at least one of the input current signal and the input voltage signal obtained by the circuit breaker system;

means for deriving said polynomial of said parameter relating to at least one of said input current signal and said input voltage signal;

logic circuit means for receiving and using said at least one of an input current signal and an input voltage signal to process and output at least one output signal;

wherein said logic circuit means determines a whole root of said polynomial root of a particular value of said polynomial of said parameter;

wherein said logic circuit means determines a slope of said polynomial of said parameter bounded by at least a first point and a second point, where said first point corresponds to a first value of said polynomial of said parameter and said second point corresponds to a second value of said polynomial of said parameter;

wherein said logic circuit means determines a difference between said particular value of said polynomial of said parameter and a value of a polynomial of said whole root;

wherein said logic circuit means determines a fractional part of said polynomial root of said particular value of said parameter using said slope and said difference;

wherein said logic circuit means determines said polynomial root by combining said whole root of said polynomial root and said fractional part of said polynomial root; and wherein said logic circuit means outputs at least one output signal using said polynomial root.

* * * * *